United States Patent Office 3,494,110
Patented Feb. 10, 1970

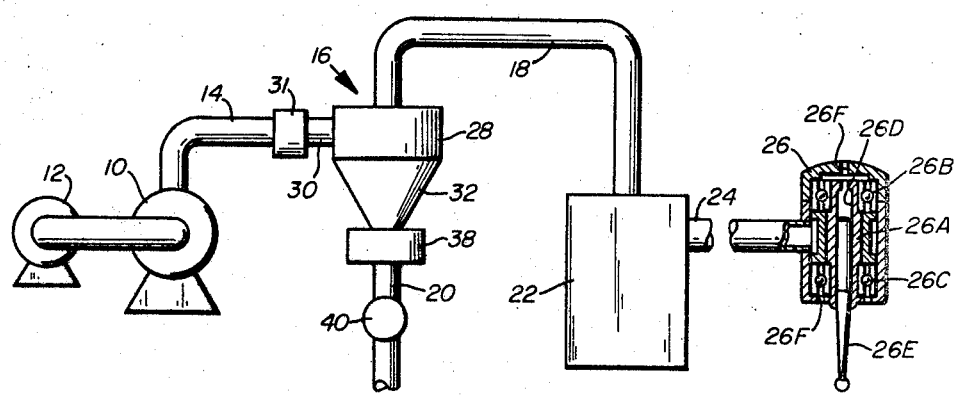
Fig. 1.
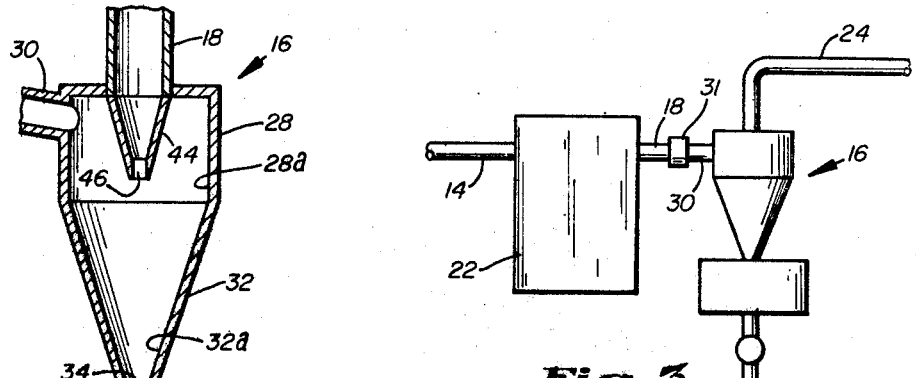
Fig. 2.
Fig. 3.
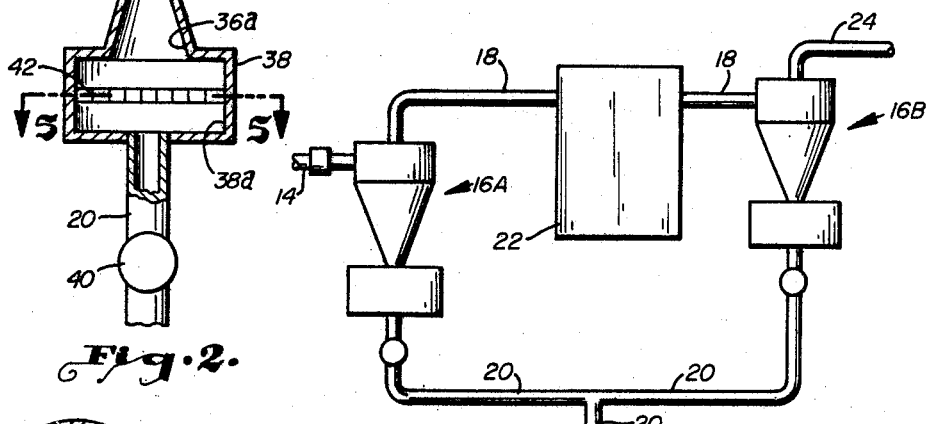
Fig. 4.
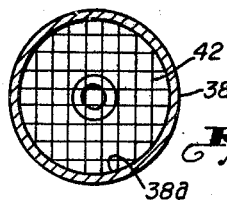
Fig. 5.
INVENTORS
ROBERT E. REED
ERNEST C. FITCH, JR
BY
Head & Johnson
ATTORNEYS

3,494,110
COMPRESSED AIR CLEANING SYSTEM FOR TURBINE POWERED DENTAL EQUIPMENT
Robert E. Reed and Ernest C. Fitch, Jr., Stillwater, Okla., assignors to Oklahoma State University, Stillwater, Okla., a corporation of Oklahoma
Filed Feb. 19, 1968, Ser. No. 706,462
Int. Cl. B01d 53/04
U.S. Cl. 55—316                                            5 Claims

ABSTRACT OF THE DISCLOSURE

A compressed air cleaning system. More particularly, the invention includes a system for providing compressed clean air and wherein compressed air is directed through a cyclonic device in which is established a free and a forced vortical air flow serving to eject entrained solid contaminants, passing the ejected solid contaminants out through a bottom outlet, and passing the clean air out through an upper outlet and through a chemical active filter for removal of non-solid contaminants.

CROSS-REFERENCE

This application is not related to any pending United States or foreign application.

SUMMARY OF THE INVENTION

Many applications require compressed air which must be substantially free of contaminants. This invention will be described as it is particularly applicable for providing compressed air for turbine powered dental equipment it being understood that such is by way of example only and that the principles of thei nvention may be applied to the purpose of providing clean compressed air for any other such similar use or application.

In a turbine powered dental drill the turbine apparatus is, of necessity, extremely small since it must be utilized within the mouth of a dental patient. Because of such extreme requirements for compactness, the orifices and air passageways in and around the turbine are extremely small and are therefore easily clogged by dirt or other contaminants borne by compressed air utilized to drive the turbine. In addition, in order to prolong the life of the turbine it is customary to inject into the air stream supplying the turbine small quantities of lubricant. Such lubricant tends to collect any dirt or contaminant carried by the air so that unless the air is exceedingly clean the orifices and passageways are soon clogged.

In addition, in many applications, and particularly in a dental drill, it is important that airborne bacteria as well as non-solid contaminants be removed from the compressed air stream so as to minimize the possibility of subjecting dental patients to infectious bacteria.

For these and other reasons it is important in many applications that a means be provided for extracting airborne contaminants, both solid and non-solid, from compressed air and it is an object of this invention to provide a means of accomplishing the objective.

DESCRIPTION OF THE VIEWS

FIGURE 1 is a diagrammatic view showing the essential elements of the invention as utilized to provide clean compressed air for a turbine powered dental drill.

FIGURE 2 is an enlarged cross-sectional view of the cyclonic element of the invention.

FIGURE 3 is a fragmentary view of the basic arrangement of FIGURE 1 show ing an alternate arrangement of the relationship of the cyclonic and purification elements of the invention.

FIGURE 4 is an additional alternate arrangement of the basic components of FIGURE 1 showing two cyclonic units having the purification element therebetween.

FIGURE 5 is a cross-sectional view taken along the line 5—5 of FIGURE 2 showing the arrangement of the grid element in the underflow pot of the cyclonic element.

DETAILED DESCRIPTION

Referring first to FIGURE 1 the basic arrangement of the invention is shown. The system includes essentially an air compressor 10 driven by a motor 12 providing compressed air through conduit 14. A cyclonic unit 16 receives the compressed air from conduit 14, the cyclonic unit having a clean air outlet conduit 18 and a contaminant outlet conduit 20. The clean air outlet conduit 18 feeds into a purification element 22 having a final clean air outlet conduit 24. Clean air is provided at the final outlet conduit 24 for an application requiring clean, compressed air, such as to feed a turbine powered dental drill 26.

It is understood that of the elements making up the basic arrangement described to this point the air compressor 10, motor 12, and the turbine powered dental drill 26 form no part of the actual invention but instead the invention is concerned with means of cleaning the compressed air provided in conduit 14 and delivering it to final outlet conduit 24 substantially free of entrained contaminants.

The heart of the system of this invention is the cyclonic unit 16 better shown in enlarged cross-sectional view in FIGURE 2. Basically the cyclonic unit 16 includes a cylindrical inlet portion 28 having inlet 30 which intersects the cylindrical portion 28 tangential to the interior cylindrical surface 28A. The inlet conduit 30 connects to the conduit 14, as shown in FIGURE 1, by means of a coupling 31.

Below the cylindrical portion 28 is a conical portion 32, having a conical interior surface 32A, the large diameter end of which coincides with the lower end of the cylindrical surface 28A. The conical portion interior surface 32A tapers to a reduced diameter vortex opening 34. Below the conical portion 32 is a subconical portion 36 communicating with conical portion 32 through the vortex opening 34. The subconical portion has an interior surface 36A which expands outwardly and downwardly in enlarged diameter communicating with an underflow pot 38. Also communicating with the underflow pot is the contaminant outlet conduit 20 having a valve 40 for use in controlling the discharge of contaminants. Valve 40 may be manually or automatically operated.

Positioned within the interior surface 38A of the underflow pot is a grid 42, the purpose of which is to break up centrifugal flow of air within the lower reaches of the cyclonic unit and permit the contaminant to settle out in a quiescent zone. The grid 42 serves to break up turbulent air flow in the underflow pot and permit downward laminar airflow into the quiescent zone below the grid.

Extending down into the cylindrical portion 28 of the cyclonic unit is a concentric conical vortex finder 44, the upper end of which communicates with clean air outlet conduit 18. The lower end of the vortex finder 44 includes an opening 46 through which clean air passes out of the cyclonic unit.

Turbine powered dental drill 26 generally consists of a small turbine wheel 26A supported between upper bearings 26B and lower bearings 26C. Compressed air flowing into the turbine drill 26 impinges upon the exterior surface of the turbine wheel 26A causing it to rotate. The turbine wheel includes an opening 26D receiving a dental drill 26E. Since the entire turbine powered dental drill 26 must be placed into the mouth of the patient by the dentist the air which passes outwardly through exhaust vents 26F in the unit passes into the mouth of the patient and for hygenic purposes must be clean of entrained contaminants including dust particles, bacteria and so forth.

The purification element 22 consists of replaceable or reactivatable type agents for adsorbing or absorbing liquid vapor, airborne corrosive chemicals and the like, such replaceable or reactivatable type agents include materials such as atapulgite clay, activated charcoal, silica gel, calcium chloride, etc.

In the arrangement of FIGURE 1 the purification element 22 is placed subsequent the cyclonic unit 16, that is between the cyclonic unit and the final clean air outlet conduit 24. This arrangement may be reversed as shown in FIGURE 3 in which the purification unit is placed in advance of the cyclonic unit.

An alternate arrangement of the invention is shown in FIGURE 4 including a first cyclonic separator unit 16A and a second cyclonic unit separator 16B in series having purification element 22 therebetween. The arrangement of FIGURE 4 provides ultimate cleaning in that the cyclonic unit 16A installed ahead of the purification system 22 provides first stage separation for solid contaminants entrained in the air. This upstream separator 16A relieves the purification system from rapid deterioration in cases of extreme contaminant entrainment in the compressed air supply. The second cyclonic unit 16B is used for obtaining very clean air for purposes such as to drive the turbine powered dental drill 26 as shown in FIGURE 1. The first cyclonic unit 16B affords protection against entrainment of sloughed chemicals which may migrate from the purification unit 22.

Thus the invention provides a new and unique arrangement for providing a clean air supply for medical and other purposes. The cyclonic unit 16 is capable of separating from the air stream entrained submicron particles contaminants and bacteria while the purification element 22 extracts non-solid components such as water vapor, chemical vapors and the like.

What is claimed:
1. A compressed air system for a turbine powered dental drill comprising:
   a turbine powered dental drill having an air inlet;
   an air compressor having an air outlet;
   a cyclonic separator unit having an upper cylindrical portion including a top wall having an axial opening therein;
   an air inlet tangentially intersecting the interior cylindrical surface of said cylindrical portion, said air inlet being connected to said compressor air outlet;
   a frusto-conical portion coaxial with said cylindrical portion having the larger internal diameter end coincident with the internal diameter of said cylindrical portion, the interior of the frusto-conical portion tapering to a reduced diameter vortical opening at the lower end thereof;
   a subfrusto-conical portion coaxial with said frusto-conical portion and said cylindrical portion, said subfrusto-conical portion having an internal frusto-conical surface defining an upper reduced diameter vortical opening coincident with said vortical opening at the lower end of said frusto-conical portion and tapering to an enlarged diameter lower opening;
   an underflow pot having an enlarged interior volume communicating with said lower opening of said subfrusto-conical portion and providing a quiescent settling zone;
   a closable contaminant outlet in the lower end of said underflow pot;
   a vortex finder extending from said top wall and co-axially within the top portion of said cylindrical portion and including an axial opening therethrough communicating with said opening in said top wall and providing a clean air outlet connected to a said turbine powered dental drill air inlet; and
   an air purification element in series with said cyclonic separator air inlet.

2. A compressed air system for a turbine powered dental drill according to claim 1 wherein said air purification element is of the adsorptive type.

3. A compressed air system for a turbine powered dental drill according to claim 1 wherein said air purification element is of the absorptive type.

4. A compressed air system for a turbine powered dental drill according to claim 1 wherein said air purification element is in series with said clean air outlet of said cyclonic separator, said air purification element having a clean air outlet; and
   a second cyclonic separator having an air inlet and a clean air outlet, said clean air outlet of said air purification element being connected to said second cyclonic separator air inlet, said second cyclonic separator clean air outlet being connectable to a turbine powered dental drill.

5. A compressed air system for a turbine powered dental drill according to claim 1 wherein said air purification element is in series with said cyclonic separator air outlet.

References Cited

UNITED STATES PATENTS

| | | | |
|---|---|---|---|
| 1,866,659 | 7/1932 | Litle | 55—388 |
| 3,250,005 | 5/1966 | White | 32—27 |
| 3,395,511 | 8/1968 | Akerman | 55—316 |
| 1,566,084 | 12/1925 | Gardner et al. | 55—459 |
| 2,566,662 | 9/1951 | Hill | 210—512 |
| 2,568,032 | 9/1951 | Stephanoff | 55—459 |
| 2,583,456 | 1/1952 | Winquist | 209—144 |
| 2,754,968 | 7/1956 | Vegter et al. | 209—211 |
| 2,966,232 | 12/1960 | Austin | 55—345 |
| 3,235,090 | 2/1966 | Bose et al. | 210—512 |
| 3,282,046 | 11/1966 | Walker et al. | 55—337 |
| 3,283,480 | 11/1966 | Szego | 55—459 |

FOREIGN PATENTS

| | | |
|---|---|---|
| 1,008,940 | 2/1952 | France. |
| 736,004 | 6/1943 | Germany. |
| 476,246 | 12/1952 | Italy. |

HARRY B. THORNTON, Primary Examiner

BERNARD NOZICK, Assistant Examiner

U.S. Cl. X.R.

32—23; 55—345, 385, 387, 388, 433, 459, 437, 473